US008727282B2

(12) United States Patent
Stolte et al.

(10) Patent No.: US 8,727,282 B2
(45) Date of Patent: May 20, 2014

(54) SAFETY SYSTEM FOR REDUCING THE EXPLOSION RISK OF A FUEL TANK

(75) Inventors: Ralf-Henning Stolte, Hamburg (DE); Herman Jansen Van Vuuren, Ockbrook (GB)

(73) Assignee: Airbus Operations GmbH (DE)

( * ) Notice: Subject to any disclaimer, the term of this patent is extended or adjusted under 35 U.S.C. 154(b) by 610 days.

(21) Appl. No.: 12/933,790

(22) PCT Filed: Sep. 23, 2009

(86) PCT No.: PCT/EP2009/062328
§ 371 (c)(1),
(2), (4) Date: Dec. 2, 2010

(87) PCT Pub. No.: WO2010/037677
PCT Pub. Date: Apr. 8, 2010

(65) Prior Publication Data
US 2011/0079683 A1    Apr. 7, 2011

Related U.S. Application Data

(60) Provisional application No. 61/194,948, filed on Oct. 2, 2008.

(30) Foreign Application Priority Data

Oct. 2, 2008   (DE) .......................... 10 2008 050 373

(51) Int. Cl.
*B64D 37/06*   (2006.01)

(52) U.S. Cl.
USPC ..................................... 244/135 R

(58) Field of Classification Search
USPC ....... 244/135 R, 135 B, 129.2; 429/443–444; 222/94, 95; 220/720, 530
See application file for complete search history.

(56) References Cited

U.S. PATENT DOCUMENTS

| 2,653,780 | A |   | 9/1953  | Pepersack |
|-----------|---|---|---------|-----------|
| 3,409,714 | A | * | 11/1968 | Strugar, Jr. .................... 264/242 |
| 3,693,825 | A | * | 9/1972  | Richman ....................... 220/227 |
| 4,213,545 | A | * | 7/1980  | Thompson et al. ........ 222/386.5 |
| 4,615,455 | A |   | 10/1986 | Tansill |
| 4,784,354 | A | * | 11/1988 | Tavano ..................... 244/135 B |

(Continued)

FOREIGN PATENT DOCUMENTS

| CN | 1301230  A  | 6/2001 |
| DE | 19649539 A1 | 6/1998 |

(Continued)

*Primary Examiner* — Tien Dinh
(74) *Attorney, Agent, or Firm* — Lerner, David, Littenberg, Krumholz & Mentlik, LLP

(57) ABSTRACT

A safety system for reducing the explosion risk of a fuel tank comprises at least one fluid source and at least one fluid container with an inlet and an outlet for a fluid, wherein the fluid container has a structure that is flexible at least in some regions and is designed in such a manner that it can be positioned in a hollow space of the fuel tank, which hollow space is situated above the fuel, with said fluid container when fluid flows into the hollow space essentially occupying the space up to the top of the fuel tank. In this way it is possible to avoid the presence of a free air volume in the fuel tank, which counteracts any formation of a potentially explosive mixture and in this way reduces the explosion risk.

14 Claims, 4 Drawing Sheets

(56) References Cited

U.S. PATENT DOCUMENTS

Figure 1:
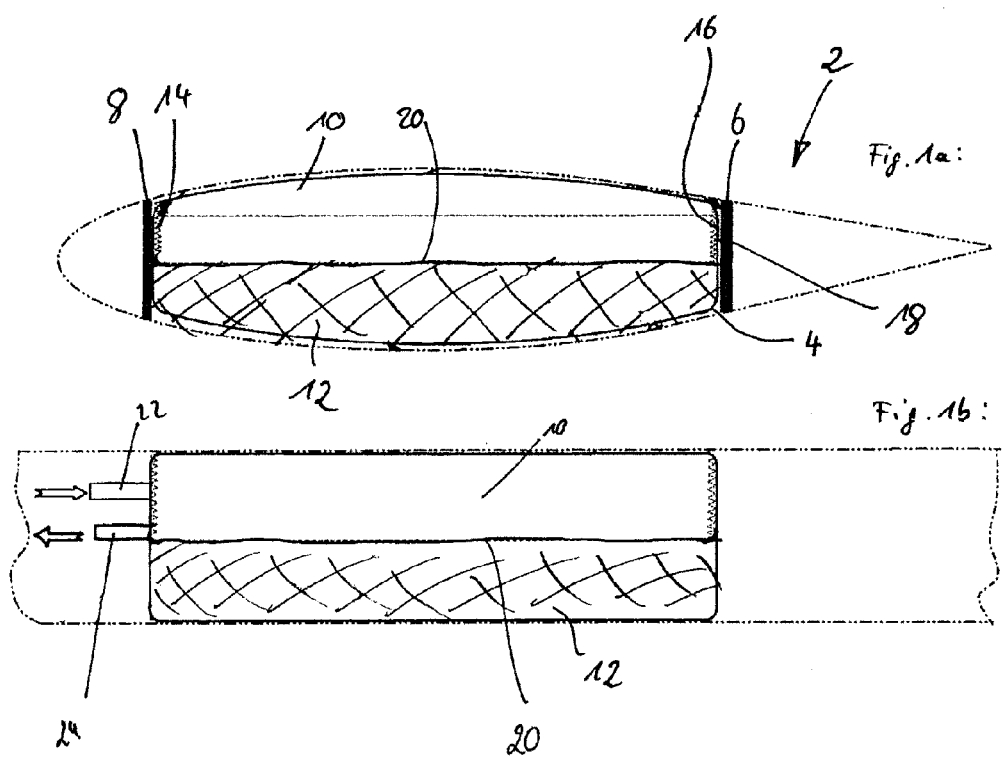

| | | | |
|---|---|---|---|
| 5,979,481 A | 11/1999 | Ayresman | |
| 6,021,978 A | 2/2000 | Goss | |
| 6,527,002 B1 | 3/2003 | Szakaly | |
| 6,830,219 B1 * | 12/2004 | Picot et al. | 244/135 R |
| 7,759,011 B2 | 7/2010 | Hoffjann et al. | |
| 2007/0111060 A1 | 5/2007 | Hoffjann et al. | |

FOREIGN PATENT DOCUMENTS

| | | |
|---|---|---|
| DE | 19742501 A1 | 4/1999 |
| DE | 102005054885 A1 | 5/2007 |
| FR | 1109506 A | 1/1956 |
| GB | 666999 A | 2/1952 |
| WO | 0158760 A1 | 8/2001 |

* cited by examiner

US 8,727,282 B2

SAFETY SYSTEM FOR REDUCING THE EXPLOSION RISK OF A FUEL TANK

CROSS-REFERENCE TO RELATED APPLICATIONS

This application is a national phase entry under 35 U.S.C. §371 of International Application No. PCT/EP2009/062328, filed Sep. 23, 2009, published in German, which claims the benefit of the filing date of German Patent Application No. 10 2008 050 373.8 filed on Oct. 2, 2008 and of U.S. Provisional Patent Application No. 61/194,948 filed Oct. 2, 2008, the disclosures of which applications are hereby incorporated herein by reference.

TECHNICAL FIELD

The invention relates to a safety system for reducing the explosion risk of a fuel tank, to the use of such a safety system, and to an aircraft comprising a safety system for reducing the explosion risk.

BACKGROUND OF THE INVENTION

Generally speaking, in a fuel tank that is not completely full, on an interface between the fuel and the hollow space above it, which hollow space comprises air, there is a danger that at a particular temperature and at a corresponding pressure a potentially explosive mixture of air and fuel gases forms. As a result of a spark or some other source of ignition this mixture can be ignited and can result in an explosion of the fuel tank. In particular when the fuel tank is that of an aircraft, this has a catastrophic effect and could result in the loss of the aircraft including the crew and the passengers.

For this reason, for example, the FAA has introduced directives that prescribe a reduction in the explosion risk of an aircraft. A known solution to this problem consists of introducing a protective gas into the fuel tank of an aircraft, wherein the protective gas is oxygen depleted or fully inerted. This results in an air-fuel mixture that arises in the fuel tank being non-flammable because of the lack of oxygen. Thus from DE 10 2005 054885 A1 and US 2007/0111060 A1 a safety system for reducing the explosion risk of a fuel tank is known, in which system oxygen-depleted air emanates from an already installed fuel cell in the aircraft and is fed to the fuel tank. However, this is associated with a problem in that the protective gas comprises very high relative atmospheric humidity which has a negative effect on the quality of the fuel. In order to dehumidify the oxygen-depleted air, condensation devices are necessary. The water obtained from the protective gas can later be reused for other purposes. As a result of the condensation devices of the safety system the total weight of the aircraft is considerably increased. Furthermore, when the aircraft is on the ground, kerosene vapours are emitted from the ventilation system of the fuel tanks to the atmosphere.

SUMMARY OF THE INVENTION

It is the object of the invention to propose a safety system for reducing the risk of a fuel tank exploding, which safety system is designed so as to be as simple as possible and as lightweight as possible, while nevertheless reliably reducing the explosion risk in the fuel tank. It is a further object of the invention to prevent the emission of kerosene vapours to the greatest extent possible. Furthermore, it may be an object of the invention with the use of inerted air to propose a less expensive condensation device.

A first important aspect of the invention consists of the safety system according to the invention comprising a fluid container with an inlet and an outlet for a fluid, wherein the fluid container has a structure that is flexible at least in some regions and is designed in such a manner that it can be positioned in a hollow space of the fuel tank, which hollow space is situated above the fuel, with said fluid container when fluid flows into the hollow space essentially occupying the space up to the top of the fuel tank. This means that the hollow space that is usually present in a fuel tank that is not completely full is taken up by a body in the shape of the fluid container according to the invention, through which body a fluid flows preferably permanently. The fluid enters the inlet of the fluid container and leaves the fluid container through the outlet. As a result of the fluid flowing in, and of the fluid initially flowing out with a delay as a result of the limited flow-through aperture of the outlet, the fluid container extends because it is flexible. The fluid container can extend in such a manner that the hollow space is essentially fully taken up by it. This per se prevents a situation in which at the interface between the fuel and the hollow space a flammable mixture forms, because there is practically no free air volume present for such a mixture to form.

One requirement of regulatory authorities prescribes a free space of 2% of the volume of the fuel tank above the fuel, due to potential volumetric expansion as the temperature rises. If it were still to be required to provide such a free space with the use of the present invention, said free space could be filled by an additional sponge-like body or by additional insulation.

If the invention relates to a fuel tank for an aircraft, the inventive embodiment of the fluid container ensures that thermal expansion effects do not result in destruction of the fuel tank or of the fluid container according to the invention. Such a pressure build-up, which might result in the fuel tank bursting, is prevented by the open outlet.

In order to prevent damage to the fuel tank in situations in which the fluid does not flow permanently through the inlet into the fluid container according to the invention, damage to the fuel tank and to the fluid container according to the invention can be prevented in that a pressure relief valve is arranged on the inlet and/or outlet of the fluid container according to the invention. As an alternative to this the provision of bursting discs is imaginable, which would have to be replaced after one-off activation. However, this could be a particularly cost-effective solution. In this way it is possible for the fuel to expand, for example in the case of a slight temperature rise, while the fluid container according to the invention shrinks in size.

A positive side-effect is provided by the fact that a conventional tank ventilation system could be eliminated as a result of the safety system according to the invention. During refueling it is necessary for air to escape from the fuel tank so that the pressure level within the fuel tank remains at the ambient level and any damage can be excluded. With the use of the safety system according to the invention enough air could flow out from the outlet of the fluid container, which air causes the fluid container to shrink, thus providing enough space for the fuel entering the fuel tank. The fuel vapours that usually emanate in a conventional ventilation system are no longer present, because the air emanating from the fluid container was not directly in contact with the fuel.

Particularly preferably, the fluid container according to the invention comprises an essentially flat top and an essentially flat bottom. The flat bottom serves to connect the fluid container according to the invention to the greatest extent possible so as to be flush with the fuel surface. This can ensure that the quantity of the free air remaining in the fuel tank can be minimised. The flat top could, for example, be advantageous if the fuel tank, too, comprises an essentially flat surface. In principle it is, however, also particularly sensible to produce the top and bottom from an elastic material such as rubber or from some other rubber-like material so that the bottom and the top can easily conform to corresponding surfaces of the fuel tank.

Particularly preferably, the fluid container according to the invention comprises at least one flexible lateral surface as a variable-height connection between the top and the bottom of the fluid container. If desired, this could make possible a correspondingly fixed design of a top and a bottom of the fluid container according to the invention, while the flexibility of the fluid container according to the invention is ensured by the height variability of at least one lateral surface. It has been shown to be particularly favourable to provide a bellows-shaped transition which in the manner of an accordion can provide a fluid container according to the invention with a very large volume.

Preferably, the inlet of the fluid container according to the invention is designed to be connected to the fluid source. This connection can take place by means of corresponding lines, tubes and the like, wherein this connection need not be non-changeable, constant and rigid, but can also be supplemented by corresponding switching valves, directional valves, pressure relief valves, nonreturn valves and other valves.

For targeted condensing of water the safety system according to the invention furthermore comprises at least one contact surface, which could, for example, be implemented by the bottom of the fluid container, which bottom is adjacent to the fuel. Generally speaking, the top of the fluid container is also suitable for this, as are the lateral surfaces, provided one of these surfaces communicates with a cool medium or material.

In the safety system according to the invention a fluid source is used whose nature can be varied. Due to their light weight, above all gaseous fluids, and in particular air, can be considered, wherein this air could preferably be oxygen-depleted or entirely inert. The invention is not limited to the above; instead the use of any non-combustible gases or gases used as oxidisers, or, if applicable, liquids could also be considered. Particularly preferably the fluid source is, however, a fuel cell which during power generation depletes the incoming air of oxygen and at an exhaust gas connection provides a relatively humid exhaust gas. This exhaust gas could enter the fluid container according to the invention so that in the fuel tank there is neither a free air volume to form a combustible mixture, nor is there a danger, in a separate body in the form of the fluid container according to the invention, of air being able to enter the fuel tank, in the case of a leakage or the like, to form a combustible mixture.

With the use of humid air as a fluid, for example from a fuel cell, it is sensible and preferred for the fluid container according to the invention to comprise a drain for discharging water. The inventive fluid container's contact surfaces to the fuel, to the top of the fuel tank, and possibly to the lateral surfaces of the fuel tank provide cold walls, on which the water vapour contained in the incoming air condenses and, for example, collects at the bottom of the fluid container according to the invention. By means of integration of the drain this relatively clean water can be removed and, for example with the use of the safety system according to the invention in an aircraft, can be provided for further use in a toilet space or the like. Furthermore, this water could be used for active cooling of the fuel cell.

Furthermore, it is preferred that the safety system according to the invention comprises at least one sensor for non-combusted hydrocarbons, which sensor could preferably be arranged on the outlet of the fluid container according to the invention. As an alternative to this, the sensor could also be arranged in the region of the drain and could detect non-combusted hydrocarbons in the condensed water. If the fluid container according to the invention were to have a defect in the form of a hole or the like, through which fuel could enter and fluid could leave, during the flow through the fluid container according to the invention a mixture might arise in which a gaseous fraction of the fuel mixes with the fluid that enters and leaves again. If this is the case, this can be detected by the sensor for non-combusted hydrocarbons, which sensor is located at the outlet, so that a corresponding warning can be issued to a person.

Furthermore, the fluid container according to the invention is preferably attached at the top of the fuel tank. This can take place by means of various types of attachment means, for example by means of press studs, hook and loop connections, clamping connections and the like. In this context it should, however, be pointed out that if possible the fluid container according to the invention should be designed in such a manner that if the fuel container is fitted or retrofitted to an aircraft said fluid container can be placed through a manhole, for example into a wing tank. Due to the very confined conditions and the presence of fuel residues it would be disadvantageous to produce elaborate positive-locking or non-positive-locking connections that involve uncomfortable preliminary work in the fuel tank.

In a safety system according to the invention a thermally essentially non-insulated fluid container can be arranged underneath an insulated fluid container, wherein the non-insulated fluid container is in direct contact with the fuel. The thermally non-insulated fluid container comprises an entry for the fluid. This is because during particularly favourable temperature conditions of the fuel during the flight an ideal condensation condition can be made use of. The underside of the non-insulated fluid container, which underside is adjacent to the fuel, comprises almost the same temperature as that of the fuel, wherein the fuel, due to its relatively great mass during takeoff remains for a relatively extended period of time at a temperature level that does not yet cause icing of the condensed water of the lower fluid container.

In order to ensure that the fluid flows out, the lower, non-insulated, fluid container can be connected by way of an overflow passage to the upper, insulated, fluid container. The fluid then issues by way of the outlet of the upper fluid container.

In order to prevent icing effects within the lower, non-insulated, fluid container, preferably a temperature sensor is integrated in the safety system, which temperature sensor acquires the temperature of the fuel or the temperature within the non-insulated fluid container. If the temperature reaches a critical level of 0° C. or below, preferably by way of a control device a switching valve is switched that is connected to the inlet of the upper, insulated, fluid container, and the lower, non-insulated, fluid container so that the inflow of fluid into the non-insulated fluid container stops, and the inflow into the upper, insulated, fluid container starts.

Furthermore, an additional, non-insulated, fluid container could be integrated so as to adjoin the interior surface of the top of the tank so that when fluid flows in through a corresponding inlet in the additional fluid container, due to the heat input a de-icing device can be supported in its effect so that, for example, an electrical de-icing device can have a lower current consumption. This applies not only to individual flight phases during which there is a danger of icing, but can also be used for de-icing on the ground.

Generally-speaking it should be pointed out that insulation of the fluid containers is sensible, because with the application of the safety system according to the invention in commercial aircraft in-flight ambient temperatures of −50° C. have to be expected. This would cause icing of water vapour and possibly blocking of inlets and outlets.

According to a further aspect of the invention, the safety system comprises a multitude of fluid containers, which can, for example, be arranged in a multitude of fuel tanks so as to, as a group, reduce the explosion risk in a group of fuel tanks. With reference to the example of an aircraft it is imaginable for fluid containers according to the invention to be used both in wing tanks and in central fuel tanks, and for them to be supplied with a corresponding fluid by way of one or several fluid sources via a line system. In wing tanks preferably in each case several fluid containers according to the invention could be used, because, due to the size of the wing tanks in modern long-haul commercial aircraft or the like, integration of a single very large fluid container according to the invention in a wing tank can be very expensive and adequate positional stability may not be ensured at every point in time.

The object is also met by the use of, and by an aircraft comprising, a system according to the invention for reducing the explosion risk of a fuel tank, according to the further independent claims.

SHORT DESCRIPTION OF THE FIGURES

Figure 2:
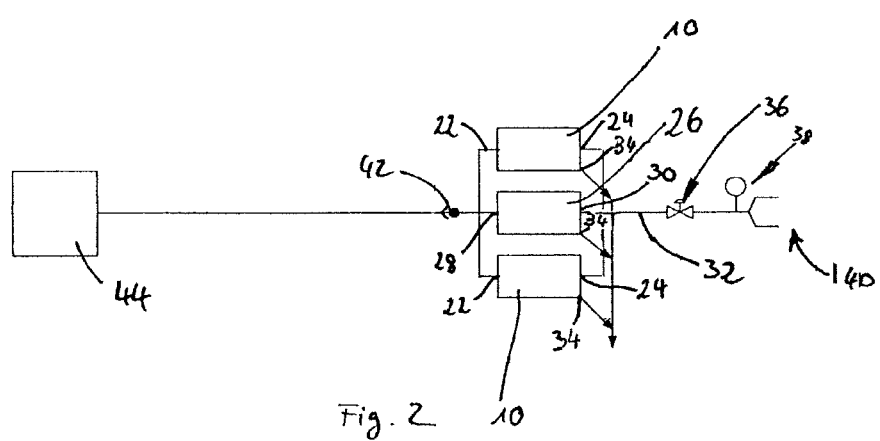
Figure 3:
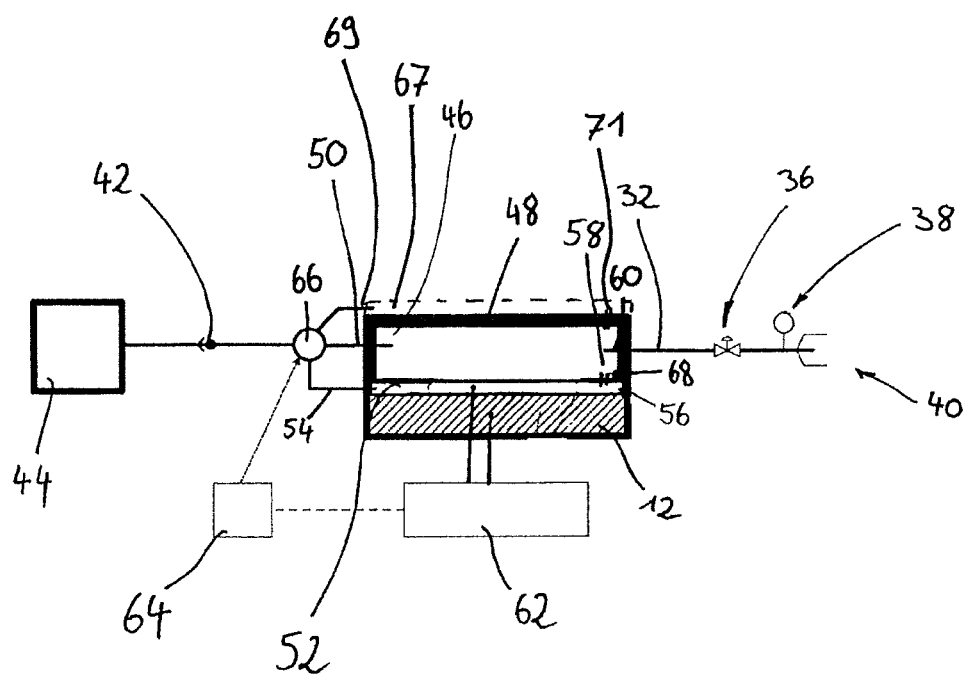
Figure 4:
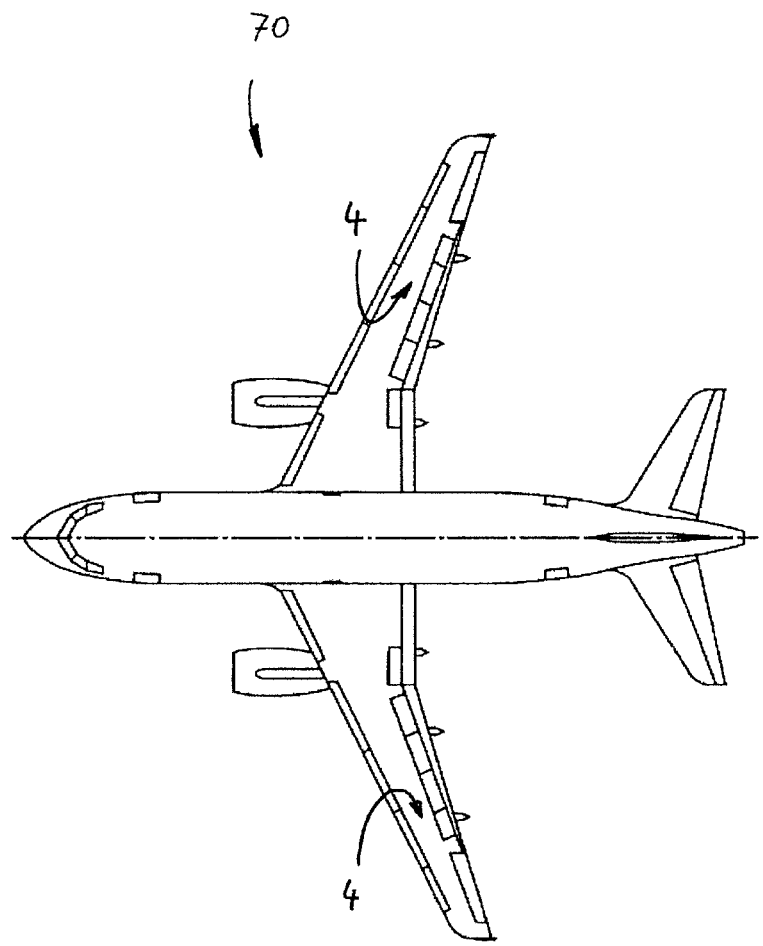

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters. The following are shown:

FIG. 1a: a lateral section view of a wing of an aircraft with a fuel tank and a safety system according to the invention;

FIG. 1b: a front section view of a wing comprising a fuel tank and a safety system according to the invention;

FIG. 2: a diagrammatic view of a safety system according to the invention;

FIG. 3: a further diagrammatic view of a safety system according to the invention; and FIG. 4: an aircraft comprising fuel tanks and a safety system according to the invention.

DETAILED DESCRIPTION OF EXEMPLARY EMBODIMENTS

FIG. 1a shows part of a wing 2 of an aircraft, which wing 2 is equipped with a fuel tank that is delimited by a first wall 6 and a second wall 8 to the leading edge and to the trailing edge of the wing 2. Within the fuel tank 4 a fluid container 10 according to the invention is arranged, which occupies a hollow space within the fuel tank 4 above the fuel 12. The lateral surfaces 14 and 16 of the fluid container 10 according to the invention are designed so as to be variable in height and are implemented in the form of bellows or bellows-like transitions 18.

If in the illustration shown the volume of the fuel 12 drops, the fuel level in the drawing plane moves downwards. At the same time in a pressurised fluid container 10 according to the invention the bottom 20 of said fluid container 10 also moves downwards so that the volume of the fluid container 10 increases overall. Between the bottom 20 and the fuel 12 there is no free air volume that could result in the formation of a combustible fuel-air mixture. In this way an explosion prevention device that is independent of the volume of the fuel 12 is accomplished.

FIG. 1b shows a front section view of the fuel tank 4 with a fluid container 10 according to the invention. The illustration shows that on the fluid container 10 according to the invention an inlet 22 and an outlet 24 are arranged by means of which the fluid can enter the fluid container 10 and can subsequently leave from it. As a result of the non-negligible flow resistance at the outlet 24, pressure can build up within the fluid container 10 according to the invention, which pressure results in expansion of said fluid container 10. The outlet 24 or a corresponding downstream valve are to be dimensioned in such a manner that the fluid container 10 according to the invention always comprises a somewhat higher pressure than its surroundings so that its bottom 20 can conform to the fuel level as effortlessly as possible.

FIG. 2 shows a diagrammatic view of the safety system according to the invention in a first exemplary embodiment. Two fluid containers 10 according to the invention are shown that are to be associated with a right-hand side and a left-hand side wing. Furthermore, an additional fluid container 26 is arranged in the safety system according to the invention, for example in a central fuel tank, with the fluid container 26 comprising an inlet 28 that with the inlets 22 of the remaining fluid containers 10 is supplied with oxygen-depleted air. The air flowing through the fluid containers 10 and 26 leaves the corresponding fluid container 10 or 26 through the outlets 24 and 30 and reaches an exhaust air line 32 from where it could flow to the surroundings by way of a drainage mast 40 or the like.

In addition, the fluid containers 10 and 26 according to the invention each comprises a drain 34, which is preferably located at the respective lowermost position, through which drain 34 the water that condenses on the walls of the fluid containers 10 and 26 can be removed. In order to support the condensation effect and collection effect the fluid containers 10 and 26 could preferably comprise a hydrophobic coating so that impinging water vapour condenses, quickly pearls off and as far as possible fully collects immediately at the respective drain 34.

Adjacent to the exhaust air line 32 is a pressure relief valve 36 that is designed to prevent an oversupply of air to the fluid containers 10 and 26, thus preventing expansion of said fluid containers 10 and 26 beyond a tolerable extent. The pressure relief valve 36 must be set in such a manner that bursting of the fuel tank or tanks is reliably prevented without the effect according to the invention of the fluid containers 10 and 26 being diminished.

Furthermore, a sensor 38 for non-combusted hydrocarbons is arranged downstream on the exhaust air line 32, by means of which sensor 38 it is possible to detect whether the air issuing from the exhaust air line 32 comprises fuel, which can allow conclusions relating to the leak tightness of the fluid containers 10 or 26. Should this be the case, a corresponding signal can be generated and issued as a warning, for example in the cockpit of an aircraft, if the safety system according to the invention is present in an aircraft.

Furthermore, the inlets 22 or 28 are supplied, by way of a nonreturn valve 42, with oxygen-depleted air by a fuel cell 44 so that the pressure present in the fluid containers 10 and 26 in all imaginable situations cannot be reduced through the inlets. In this context it is also imaginable to use an internal combustion engine or its exhaust gas line or the like as a fluid source.

FIG. 3 shows a modification of the safety system according to the invention. As an example a fluid container 46 is shown that comprises insulation 48. The insulation is dimensioned in such a way that with a permanent inflow of air in an inlet 50 of the fluid container 46 a temperature of at least 5° C. can be attained within the fluid container 46, even at cruising altitude. A second, relatively flat, fluid container 52 is situated underneath the fluid container 46, which directly adjoins the fuel 12 and is not insulated. This second fluid container 46 could preferably be used for condensing water vapour, because the contact surface between the second fluid container 46 and the fuel represents an ideal heat sink. Correspondingly, the second fluid container 52 also comprises an inlet 54, through which inlet 54 air can be fed into the second fluid container 52 where subsequently condensation of the water vapour occurs, and the condensed water is conveyed to a drain 56. By means of an overflow passage 58 in the form of one or several hoses or other types of lines, the air that has flowed in can overflow into the upper fluid container 46 and there it can reach the exhaust air line 32 through the outlet 60.

To protect against icing when the fuel cools down in flight, a temperature sensor 62 is integrated in the lower second fluid container 52 and/or in the fuel tank, which when the temperature reaches or falls below 0° C. initiates switching of a switching valve 66 by way of a control unit 64. This leads to a situation in which at temperatures of 0° C. or less only the upper, insulated, fluid container 46 is impinged on by air from the air source. Any condensed water arising is removed from a drain 68. However, if the temperature exceeds 0° C., the air is conveyed through the lower, second, and non-insulated fluid container 52 where more ideal condensation conditions prevail. Consequently, water harvesting as a result of condensation is clearly improved.

In addition a further, additional, non-insulated fluid container 67 could be arranged on the top of the tank 4 so that when a fuel cell is used as a fluid source, the heat input could assist a de-icing device. To this effect the additional fluid container 67 comprises an inlet 69 as well as an overflow passage 71 to the fluid container 46 situated below it. An inlet of the additional fluid container 67 could also be connected to the switching valve 66 so that icing protection is provided in a manner as explained analogously in the context of the embodiments described above.

Lastly, FIG. 4 shows a modern commercial aircraft 70 comprising several fuel tanks equipped with the safety system according to the invention.

The examples described are only intended to clarify the context according to the invention; they are not to be interpreted as limitations of the invention or of the scope of protection. Instead, the principle according to the invention can also be applied to fuel tanks that are not situated in aircraft, nor even in vehicles, without having to do without the advantages provided according to the invention.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

REFERENCE CHARACTERS

2 Wing
4 Fuel tank
6 Rear wall of the fuel tank
8 Front wall of the fuel tank
10 Fluid container
12 Fuel
14 Lateral surface of the fluid container
16 Lateral surface of the fluid container
18 Bellows-like transition
20 Bottom of the fluid container
22 Inlet
24 Outlet
26 Fluid container
28 Inlet
30 Outlet
32 Exhaust air line
34 Drain
36 Pressure relief valve
38 Sensor for non-combusted hydrocarbons
40 Drainage mast
42 Nonreturn valve
44 Fuel cell
46 Fluid container (insulated)
48 Insulation
50 Inlet
52 Fluid container (non-insulated)
54 Inlet
56 Drain
58 Overflow passage
60 Outlet
62 Temperature sensor
64 Control unit
66 Switching valve
67 Additional fluid container
68 Outlet
69 Inlet
70 Aircraft
71 Overflow passage

The invention claimed is:

1. A safety system for reducing the explosion risk of a fuel tank, comprising:
   at least one fluid source;
   at least one fluid container for holding a fluid, the at least one fluid container having an inlet and an outlet;
   a drain for discharging water; and
   at least one sensor for detecting non-combusted hydrocarbons in at least one of the outlet or a region of the drain;
   wherein the fluid container has a structure that is flexible at least in some regions and is adapted to be positioned in a hollow space of the fuel tank, the hollow space being located above the fuel contained within said fluid container; and
   wherein, when fluid flows into the hollow space, the fluid substantially fills the hollow space up to a top of the fuel tank.

2. The safety system of claim 1, wherein the fluid container comprises at least one flexible lateral surface functioning as a variable-height connection between a top and a bottom of the fluid container.

3. The safety system of claim 1, wherein the fluid container comprises a substantially bellows-like transition between a top and a bottom thereof.

4. The safety system of claim 1, wherein the inlet is adapted to be connected to the fluid source.

5. The safety system of claim 1, wherein the fluid container comprises at least one contact surface for a targeted condensing of water.

6. The safety system of claim 1, wherein the fluid source provides oxygen-depleted air.

7. The safety system of claim 1, wherein the fluid container is attached at a top of the fuel tank.

8. The safety system of claim 1, wherein a substantially thermally non-insulated fluid container in contact with the fuel is positioned underneath an insulated fluid container, wherein the thermally non-insulated fluid container comprises an inlet for the fluid.

9. The safety system of claim 8, wherein the thermally non-insulated fluid container is connected by way of an overflow passage to the insulated fluid container so that fluid flowing into the thermally non-insulated fluid container is able to flow out through the insulated fluid container.

10. The safety system of claim 9, further comprising a temperature sensor for detecting a temperature in at least one of the fuel tank or the thermally non-insulated fluid container wherein, if the detected temperature reaches a level of 0° C. or below, a switching valve interrupts an inflow of fluid into the thermally non-insulated fluid container and causes an inflow of fluid into the thermally insulated fluid container.

11. The safety system of claim 1, wherein a substantially thermally non-insulated fluid container is positioned so as to be in contact with a top of a fuel tank and designed as a wing tank of an aircraft to assist a de-icing device.

12. The safety system of claim 1, wherein a bottom and a top of the fluid container comprise an elastic material so that the bottom and the top of the fluid container conform to a shape of the fuel tank.

13. The safety system of claim 1, comprising a plurality of fluid containers, each having inlets connected to one or several shared fluid sources via a line system.

14. An aircraft with at least one fuel tank and at least one safety system for reducing the risk of a fuel tank exploding, comprising:
- at least one fluid source; and
- at least one fluid container for holding a fluid, the at least one fluid container having an inlet and an outlet;
- a drain for discharging water; and
- at least one sensor for detecting non-combusted hydrocarbons in at least one of the outlet or a region of the drain;
- wherein the fluid container has a structure that is flexible at least in some regions and is adapted to be positioned in a hollow space of the fuel tank, the hollow space being located above the fuel contained within said fluid container; and
- wherein, when fluid flows into the hollow space, the fluid substantially fills the hollow space up to a top of the fuel tank.

\* \* \* \* \*